United States Patent
Leib et al.

(10) Patent No.: US 7,668,944 B2
(45) Date of Patent: Feb. 23, 2010

(54) SYSTEM AND UNIFIED SETTING INTERFACE FOR CONFIGURING NETWORK MANAGEABLE DEVICES

(76) Inventors: Evgeny Leib, 31a Hamovil Street, Kfar Saba (IL) 44424; Joshua Glazer, 6 Halamed Hey Street, Ra'anana (IL) 43341; Leonid Liansky, 74 Desert View Crescent, Richmond Hill, Ontario (CA) L4C 0K4

( * ) Notice: Subject to any disclaimer, the term of this patent is extended or adjusted under 35 U.S.C. 154(b) by 1137 days.

(21) Appl. No.: 10/986,831

(22) Filed: Nov. 15, 2004

(65) Prior Publication Data

US 2005/0198234 A1 Sep. 8, 2005

Related U.S. Application Data

(60) Provisional application No. 60/545,935, filed on Feb. 20, 2004.

(51) Int. Cl.
*G06F 15/16* (2006.01)

(52) U.S. Cl. .................. 709/222; 709/203; 709/228; 709/229; 709/250; 370/254; 370/257; 710/36; 710/37; 710/38

(58) Field of Classification Search ................. 709/203, 709/222, 228, 229, 250; 370/254, 257; 710/36, 710/37, 38
See application file for complete search history.

(56) References Cited

U.S. PATENT DOCUMENTS

| | | | |
|---|---|---|---|
| 5,819,042 A | 10/1998 | Hansen | |
| 6,286,038 B1* | 9/2001 | Reichmeyer et al. | 709/220 |
| 6,629,145 B1 | 9/2003 | Pham et al. | |
| 6,650,347 B1 | 11/2003 | Nulu et al. | |
| 7,249,170 B2* | 7/2007 | Tindal et al. | 709/223 |
| 2002/0069275 A1 | 6/2002 | Tindal | |
| 2002/0147797 A1* | 10/2002 | Paul | 709/220 |
| 2002/0161863 A1* | 10/2002 | McGuire | 709/220 |
| 2003/0140132 A1 | 7/2003 | Champagne et al. | |
| 2003/0212773 A1 | 11/2003 | Sullivan | |

\* cited by examiner

*Primary Examiner*—Jinsong Hu
(74) *Attorney, Agent, or Firm*—Lee & Hayes, PLLC

(57) ABSTRACT

A unified setting interface that enables a management application to configure network manageable devices, regardless of their type or manufacturer. Configuration of a network manageable device requires that certain information be provided to the network manageable device. For different types of devices from different manufacturers, this information and its format can vary. A management application using the unified setting interface does not require the individual interfaces for configuring network manageable devices from different manufacturers.

24 Claims, 7 Drawing Sheets

```
                4010    [Linksys BEFSR41]
                4020      [ID]
               ┌4030        HTTPID = Linksys BEFSR41/BEFSR11/BEFSRU31
               │ 4040        Username =
               │ 4050        Password = admin
               │ 4060      [Index]
               │ 4070        Method = GET
               │ 4080        URL = /
               │ 4090        RE_first = <\s*script[^>]+src\s*=\s*Gozila\.js
               │ 4100        RE_first = Firmware\s+Version:\s*(?:(?: |<[^>]+>)\s*)+?(?:[^&<]+)
               │ 4110        []
               │ 4130      []
               │ 4140      [COMMON]
               │ 4150        [QUERY_Status]
               │ 4160          Method = GET
               │ 4170          URL = /Status.htm
               │ 4180          RE_first =
               │        Firmware\s+Version:\s*(?:(?: |<[^>]+>)\s*)+(?P<Firmware_Version>[\w.,\r\n ]*)
               │ 4190          []
               │ 4200        [QUERY_index]
   Sub-        │ 4210          Method = GET
   entries    ─┤ 4220          URL = /index.htm
               │ 4230          RE_last =
               │        WANConnectionType.*?value\s*=\s*(?P<WAN_Connection_Type>\d+)[^>]*selected[^>]*>
               │ 4240          []
               │ 4250        [PARAMETERS]
               │ 4260          PARAM = (Firmware_Version)[string(1)]%Firmware_Version%
               │ 4270          PARAM =
               │        (WAN_Connection_Type)[string(3)((dhcp),(static),(pppoe))]%WAN_Connection_Type
               │        %=1:2:3?dhcp:static:pppoe:unknown
               │ 4280          []
               │ 4290        [SUBMIT_wan_Main]
               │ 4300          Method = GET
               │ 4310          URL =
               │        /Gozila.cgi\?WANConnectionType\=($WAN_Connection_Type$=dhcp:static:pppoe?1:
               │        2:3:1)
               │ 4320          Wait = 12
               │ 4330          []
               │ 4340        []
               └ 4350      []
```

*FIG. 4*

SYSTEM AND UNIFIED SETTING INTERFACE FOR CONFIGURING NETWORK MANAGEABLE DEVICES

CROSS-REFERENCES TO RELATED APPLICATIONS

This application is an application filed under 35 U.S.C. § 111(a), claiming benefit pursuant to 35 U.S.C. § 119(e) of the filing date of the Provisional Application Ser. No. 60/545,935 filed on Feb. 20, 2004, pursuant to 35 U.S.C. § 111(b). The Provisional Application Ser. No. 60/545,935 is herein incorporated by reference in its entirety.

BACKGROUND OF THE INVENTION

1. Technical Field of the Invention

The present invention relates generally to computer network maintenance tools, and more particularly, to a maintenance tool for configuring network manageable devices of a computer network.

2. Description of the Related Art

Recent market research has shown that consumer demand for local networking is driven by the rapid growth of the Internet, high-speed Internet connections and multiple household personal computers (PCs). Local networks are designed to allow PCs, peripheral devices, and other consumer electronic devices to share voice and data over a single network. Local networks may be a local area network (LAN) or wireless LAN (WLAN).

Setting up a local network requires users to provide information about how to configure the computers, firewalls, Ethernet settings and addresses, file sharing, printer sharing, Internet connection sharing, wireless addresses and other parameters specific to a particular local network. The setup of a network requires configuring the network manageable devices properly, and the configuration of the manageable devices is managed through user interface software. The user interface software (hereinafter the "setting interface") allows a network administrator or user to configure and manage a single network manageable device. Network administrators or users expect the setting interface to be navigable, quick and safe. The setting interface should enable a novice network administrator or novice user to perform routine operations, to permit a user to tackle a network problem with a timely response, to enforce privilege levels and reconfirm commands that impact service.

Conventional setting interfaces comprise monitor prompts for setting registers, form-based dialogs, menu-based systems, command languages and natural-language parsers. Typically, for the purpose of configuring a network manageable device, the access to the network manageable device is through a Telnet connection, a hypertext transfer protocol (HTTP) connection or a simple network management protocol (SNMP) connection. The setting interface and the access to a network manageable device are generally controlled by a management application installed in each of the computing devices that communicates with the network manageable device.

Presently, setting interfaces are not standardized by the networking industry, thus each vendor provides a different set of device-specific commands to set the network manageable device and a different form of connection to access the network manageable device. In many instances, the same set of device-specific commands cannot be used on all of the network manageable devices.

To date, a large number of setting interfaces are provided allowing the configuration and management of different types of network manageable devices. The lack of a standardized setting interface requires the users (e.g., system administrators or technical support personnel) to be familiar with the various setting interfaces. Furthermore, the lack of a standardized setting interface limits the ability to develop a generic application programming interface (API) for management applications to manage and configure the various types of network manageable devices.

Therefore, in the view of the foregoing discussion, it would be advantageous to provide a generic solution that would allow management applications to configure, through a single interface, network manageable devices regardless their type and manufacture.

SUMMARY OF THE INVENTION

The invention has been made in view of the above circumstances and to overcome the above problems and limitations of the prior art, and to provide methods, software and apparatuses for the management of network manageable devices that use a plurality of different management applications to manage one or more network devices that are connected to a hard-wired or wireless network.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

A first aspect of the invention is a system that enables the configuration of at least one network manageable device. The system comprises a unified setting interface that interfaces with a management application to generate a device request, and a request generator that generates a submission request to network manageable device based on a translated device request received from the unified setting interface. The unified setting interface allows the management application to modify configurable parameters of the network manageable device, and, for each of the configurable parameters, the unified setting interface provides a unique name regardless of the type of the network manageable device. The unified setting interface comprises a set of commands through which the management application sets the configurable parameters and comprises a database. Each of the entries in the database comprises a plurality of sub-entries, each having a regular expression, a manageable device script, an authorization parameter, an identification parameter and an address of a configurable parameter. The manageable device script is used for generating the submission request.

A second aspect of the invention is a system that enables the configuration of at least one network manageable device. The system comprises an interface means that interfaces with a management application to generate a device request, and a request means that generates a submission request to network manageable device based on a translated device request received from the interface means. The interface means allows the management application to modify configurable parameters of the network manageable device, and, for each of the configurable parameters, the interface means provides a unique name regardless of the type of the network manageable device. The interface means comprises a set of commands through which the management application sets the configurable parameters and comprises a database. Each of the entries in the database comprises a plurality of sub-entries, each having a regular expression, a manageable device script, an authorization parameter, an identification parameter and an address of a configurable parameter. The manageable device script is used for generating the submission request.

A third aspect of the present invention is a system that enables the configuration of at least one network manageable device. The system comprises a unified setting interface that interfaces with a management application to generate a device request and a response processor that executes a regular expression on a response output by the network manageable device that received the device request. The regular expression extracts data from the network manageable device response and forwards the extracted data to the unified setting interface for transfer to the management application. The unified setting interface allows the management application to modify configurable parameters of the network manageable device, and, for each of the configurable parameters, the unified setting interface provides a unique name regardless of the type of the network manageable device. The unified setting interface comprises a set of commands through which the management application sets the configurable parameters and comprises a database. Each of the entries in the database comprises a plurality of sub-entries, each having a regular expression, a manageable device script, an authorization parameter, an identification parameter and an address of a configurable parameter. The manageable device script is used for generating the submission request. The response processor comprises a parser that parses the response output by the network manageable device and a regular expression engine that executes a regular expression to extract data to be forwarded to the unified setting interface.

A fourth aspect of the invention is a system that enables the configuration of at least one network manageable device. The system comprises an interface means that interfaces with a management application to generate a device request, and response means that executes a regular expression on a response output by the network manageable device that received the device request. The regular expression extracts data from the network manageable device response and forwards the extracted data to the interface means for transfer to the at least one management application. The interface means allows the management application to modify configurable parameters of the network manageable device, and, for each of the configurable parameters, the interface means provides a unique name regardless of the type of the network manageable device. The interface means comprises a set of commands through which the management application sets the configurable parameters and comprises a database. Each of the entries in the database comprises a plurality of sub-entries, each having a regular expression, a manageable device script, an authorization parameter, an identification parameter and an address of a configurable parameter. The manageable device script is used for generating the submission request. The response means comprises means for parsing the response output by the network manageable device, and engine means for executing a regular expression to extract data to be forwarded to the unified setting interface.

A fifth aspect of the invention is a system enabling the configuration of at least one network manageable device. The system comprises a unified setting interface that interfaces with a management application to generate a device request and a request generator that generates a submission request to the network manageable device based on a translated device request received from the unified setting interface. A response processor executes a regular expression on a response output by the network manageable device that received the translated device request, and the regular expression extracts data from the network manageable device response and forwards the extracted data to the unified setting interface for transfer to the management application. The unified setting interface allows the management application to modify configurable parameters of the network manageable device, and for each of the configurable parameters, the unified setting interface provides a unique name regardless of the type of the network manageable device. The unified setting interface comprises a set of commands through which the management application sets the configurable parameters and comprises a database. Each of the entries in the database comprises a plurality of sub-entries, each having a regular expression, a manageable device script, an authorization parameter, an identification parameter and an address of a configurable parameter. The manageable device script is used for generating the submission request. The response processor comprises a parser that parses the response output by the network manageable device and a regular expression engine that executes a regular expression to extract data to be forwarded to the unified setting interface.

A sixth aspect of the present invention is a method for enabling the configuration of a plurality of network manageable devices. The method comprises establishing a connection with a network manageable device selected from the plurality of network manageable devices, detecting the type of the network manageable device, retrieving description information and configurable parameters of the network manageable device and generating a unified setting interface for the network manageable device using the description information and the configurable parameters. The method further comprises identifying an entry in a database from a plurality of entries, wherein each of the plurality of entries is associated with at least one of the plurality of network manageable devices. Each entry can comprise a plurality of sub-entries, such as a regular expression, a manageable device script, an authorization parameter, an identification parameter and an address of a configurable parameter. The manageable device script is used for generating a submission request for modifying the setting of a configurable parameter. The regular expression is used to extract the values of the configurable parameters. Establishing a connection with the network manageable device comprises submitting the authorization parameters required to logon to the network manageable device, such as a username and a password. Description information of the manageable device can comprise a vendor name, a serial number, a version, a firmware version, a type and a manufacturer name. The unified setting interface provides a single interface through which the management applications access the plurality of network manageable devices, and provides for each of the configurable parameters a unique name regardless of the type of the network manageable device. The method is utilized for the purpose of a first time setup of the network manageable devices, detecting malfunctions in the network manageable devices and providing a unified environment for configuring a plurality of network manageable devices.

A seventh aspect of the invention is a computer program product enabling the configuration of a plurality of network manageable devices, the computer program product containing executable code capable of establishing a connection with a network manageable device selected from the plurality of network manageable devices, detecting the type of the network manageable device, retrieving description information and configurable parameters of the network manageable device; and generating a unified setting interface for the network manageable device using the description information and the configurable parameters. The method embodied in the computer executable code further comprises identifying an entry in a database from a plurality of entries, wherein each of the plurality of entries is associated with at least one of the plurality of network manageable devices. Each entry can comprise a plurality of sub-entries, such as a regular expression, a manageable device script, an authorization parameter, an identification parameter and an address of a configurable parameter. The manageable device script is used for generating a submission request for modifying the setting of a configurable parameter. The regular expression is used to extract the values of the configurable parameters. Establishing a connection with the network manageable device comprises submitting the authorization parameters required to logon to the network manageable device, such as a username and a password. Description information of the manageable device can comprise a vendor name, a serial number, a version, a firmware version, a type and a manufacturer name. The unified setting interface provides a single interface through which the management applications access the plurality of network manageable devices, and provides for each of the configurable parameters a unique name regardless of the type of the network manageable device. The method embodied in the computer executable code is utilized for the purpose of a first time setup of the network manageable devices, detecting malfunctions in the network manageable devices and providing a unified environment for configuring a plurality of network manageable devices.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

FIG. 4 is an exemplary schema of a content maintained by the database in accordance with an embodiment of the present invention.

DESCRIPTION OF THE PREFERRED EMBODIMENTS

The present invention provides unified setting interface (USI) that enables a management application to configure network manageable devices through a single interface, without regard to their type or manufacturer. Configuration of a network manageable device requires that certain information be provided to that device. For different types and manufacturers of devices, this information and the format of the information can vary. A management application requires only an implementation of the unified setting interface, not the individual interfaces for the various network manageable devices, to configure one or more network manageable devices of different types and/or from different manufacturers. The network manageable devices include, but are not limited to, wired or wireless bridges, routers, hubs, gateways, switches, printers, DVD players, MP3 players or any other manageable device that is connected to a network, either through a physical connection (Ethernet, optical fiber, twisted pair, etc.) or through a wireless connection (IEEE 802.11 standard, WiFi, Bluetooth, etc.).

Figure 1:
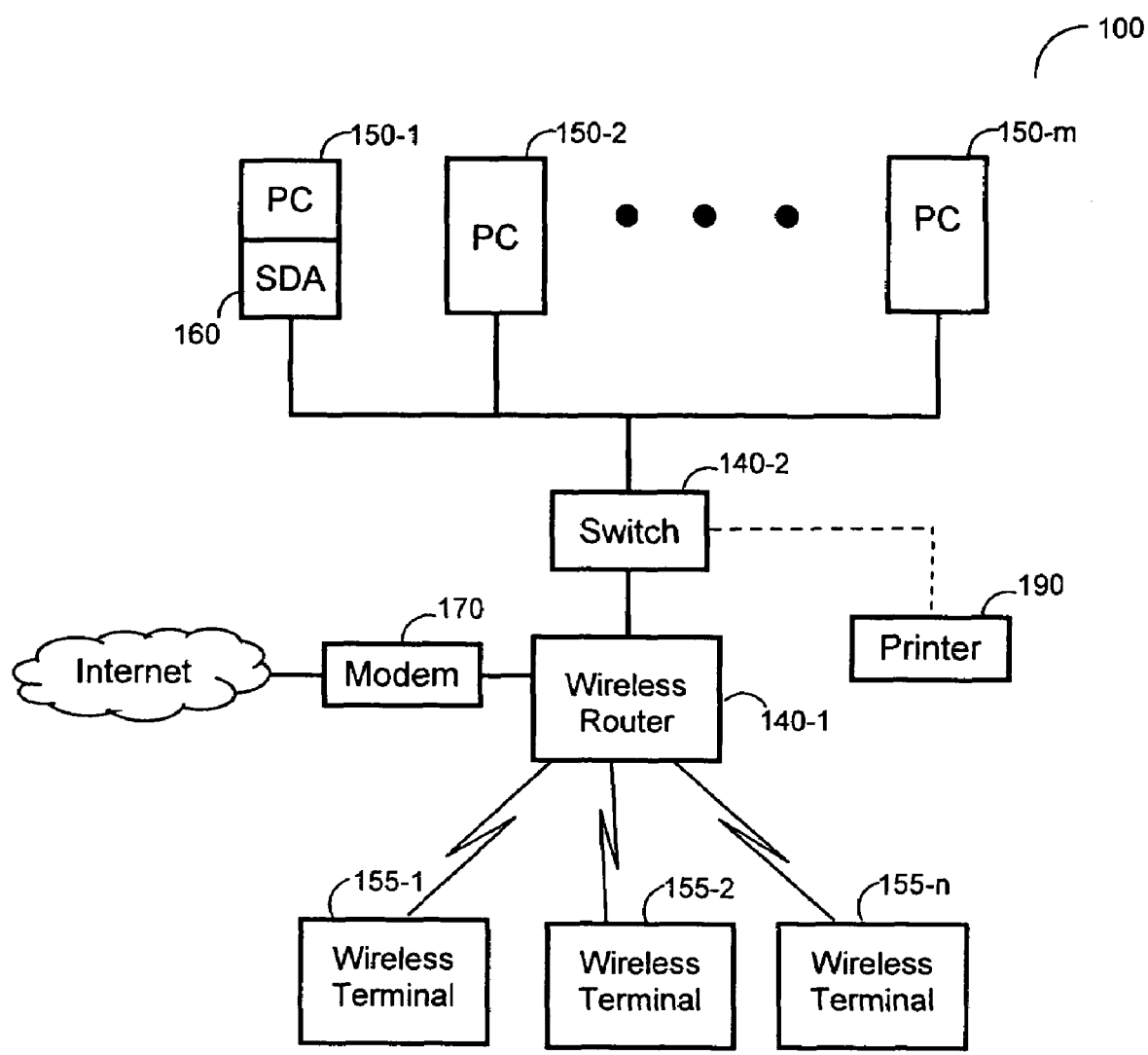
FIG. 1 depicts a non-limiting typical local network for the purpose of illustrating an embodiment of the present invention.

Referring to FIG. 1, a non-limiting local network 100 that illustrates an embodiment of the present invention is shown. In this configuration network 100 is composed of a local area network (LAN) and a wireless LAN (WLAN). The WLAN may be based on the IEEE 802.11 standard, WiFi, Bluetooth, infrared or other suitable networking standards and methodologies. Network 100 comprises a wireless router 140-1, a network switch 140-2, a plurality of terminals 150-1, 150-2, 150-*m* that are connected to the network switch 140-2 by a wire connection, and a plurality of wireless terminals 155-1, 155-2, 155-*n* that are connected to the wireless router 140-1 by a wireless connection. The terminals 150 and the wireless terminals 155 may be, but are not limited to, personal computers (PCs), personal digital assistants (PDAs), handheld computers, tablet computers, notebook computers and any other type of handheld or personal wireless electronic device. Network 100 further includes access to the Internet. In the illustrative network 100, modem 170 is a broadband modem (xDSL, cable, optical, satellite, etc.) that provides access to the Internet, but other types of linkages could be used as well to provide Internet access.

In network 100, different manufacturers manufacture the wireless router 140-1 and the network switch 140-2. For example, wireless network 140-1 might be a Linksys™ router, while network switch 140-2 might be a Belkine® switch. Each network manageable device has a different set of configurable parameters and a different type of interface. Therefore, in order to communicate with the wireless router 140-1 and the network switch 140-2, a management application would have to implement at least two different interfaces. Furthermore, user intervention is required in order to determine the type of the accessed manageable device and its respective interface.

The unified setting interface provides a single interface through which a management application accesses and configures a plurality of network manageable devices, i.e., the wireless router 140-1 and the network switch 140-2. The unified setting interface is utilized through a setting diagnostic agent (SDA) 160 installed in one or more of the terminals 150 and wireless terminals 155. The setting diagnostic agent can be installed in any terminal that can execute the management applications. The setting diagnostic agent 160 automatically identifies a network manageable device (wireless router 140-1 and network switch 140-2) and detects its type, firmware version, vendor, manufacture name and other attributes that uniquely identify the network manageable device. The setting diagnostic agent 160 further retrieves the configurable parameters of the network manageable device and generates the unified setting interface for the management application.

The generation of the unified setting interface is performed by: a) accessing a network manageable device; b) retrieving the description and the configuration parameters of the network manageable device; c) giving each configuration parameter a unique name regardless of the type of network manageable device; and d) providing a common set of commands through which the management applications configure the plurality of network manageable devices. For the generation of the unified setting interface, the present invention uses regular expressions and manageable device scripts as will be described in greater detailed below. The setting diagnostic agent 160 stores the regular expressions, the manageable device scripts and configuration data required to manage the network manageable devices in memory, or more preferably, in a database. The regular expressions and the manageable device scripts are not provided by the vendors of the network manageable devices or the vendors of the management applications, but instead are created by the network user or network administrator. It is foreseen, however, that the vendors of the network manageable devices or the vendors of the management applications could provide the regular expressions, manageable device scripts and configuration data required for managing the network manageable devices to network users. The regular expressions, manageable device scripts and configuration data could be provided on a variety of different computer-readable media to the network user or network administrator, or could be available for downloading to the setting diagnostic agent 160 via a hard-wired or wireless connection.

In exemplary embodiment of the present invention, the unified setting interface is similar to an application programming interface (API) through which all management applications use for the purpose of interacting with the network manageable devices. Specifically, the unified setting interface allows the management application to retrieve and modify configurable parameters in a network manageable device. The setting diagnostic agent 160 communicates with the network manageable devices (wireless router 140-1 and network switch 140-2, the printer 190) using the connection format utilized by the network manageable devices. The connection formats include, but are not limited to, Telnet, HTTP, SNMP, universal plug and play (UPnP) protocol and others. For example, the printer 190 is a networked printer that may be configured through the UPnP protocol.

The unified setting interface is automatically modified if a network manageable device is added or removed from the network. For example, once the setting diagnostic agent detects a new connection with a network manageable device, the configuration information of the device is added to the unified setting interface. If a connection is broken, the configuration information of the network manageable device is removed from the unified setting interface.

One skilled in the art will appreciate that the components of setting diagnostic agent 160 described herein may be hardware components, firmware components, software components or combinations thereof.

Figure 2:
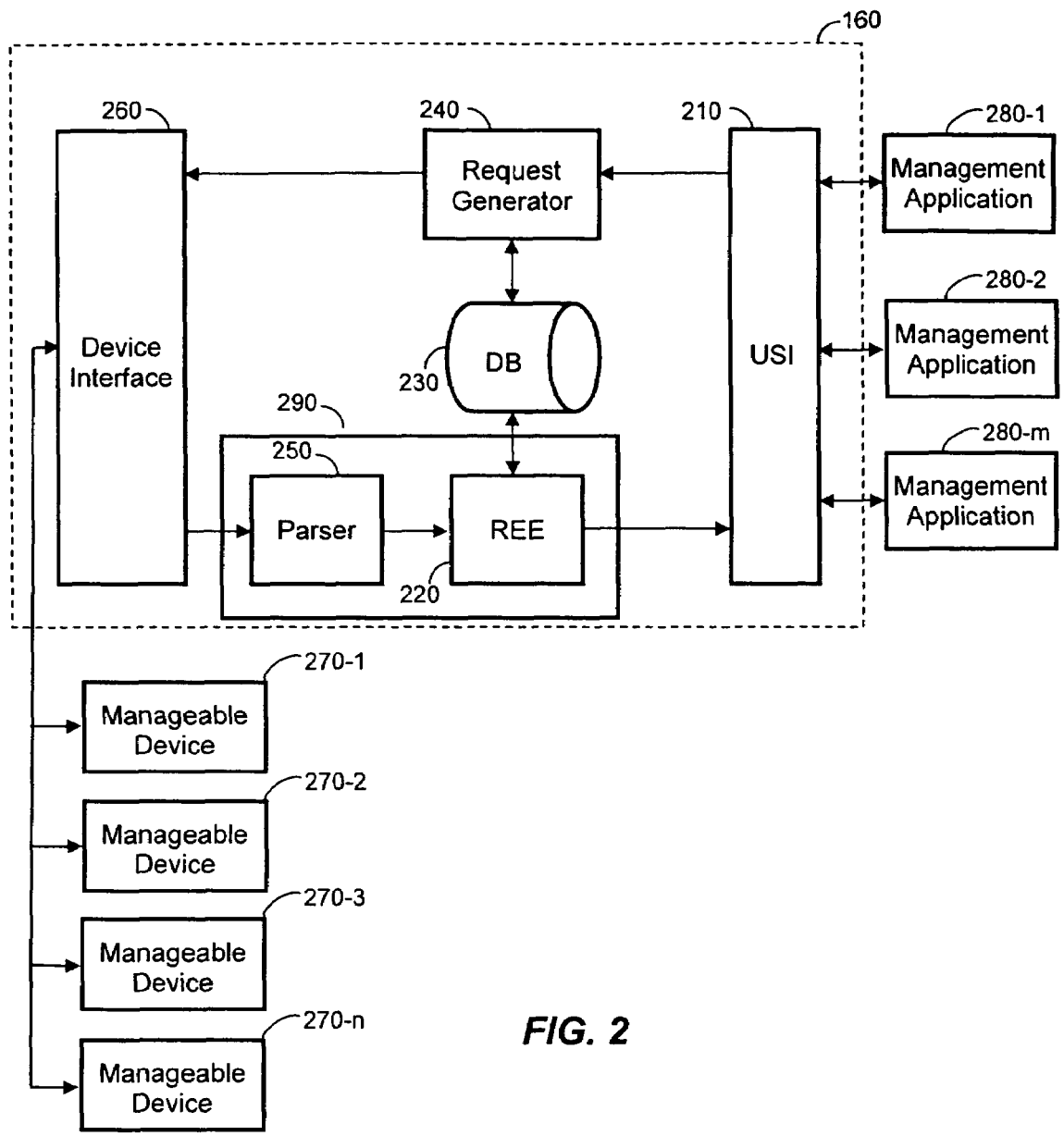
FIG. 2 is a non-limiting functional diagram of the setting diagnostic agent in accordance with an embodiment of the present invention.

Referring to FIG. 2, a non-limiting functional diagram of the setting diagnostic agent 160 in accordance with an embodiment of the present invention is shown. Preferably, the setting diagnostic agent 160 comprises a unified setting interface 210, a database (DB) 230, a request generator 240, a response processor 290 and a device interface 260. The response processor 290 comprises a regular expression engine (REE) 220 and a parser 250. The response processor 290 and the database 230 support the provision of network device parameters to the unified setting interface 210. The request generator 240 and the database 230 support the modification of network device parameters through the unified setting interface 210. The management applications 280-1, 280-2 and 280-*m* access a plurality of manageable devices 270-1, 270-2, 270-3 and 270-*n* through the unified setting interface 210. The plurality of network manageable devices 270-1, 270-2, 270-3 and 270*n* is connected to the device interface 260.

The request generator 240 generates a submission request (e.g., HTTP requests) to modify the network manageable device's parameters. Specifically, the request generator 240 executes manageable device scripts that are used to create the submission requests in a format compliant with a specific network manageable device. A management application sends a device request to the unified setting interface 210, which in turn forwards the device request to the request generator 240. The database 230 is searched for the manageable device script(s) associated with the particular network manageable device identified by the unified setting interface 210. A manageable device script is designed to generate a submission request for a specific type of network manageable device. For example, a manageable device script can generate a string buffer based on previously obtained router parameters or parameters requested to be modified. The parameters are inserted to the resulting string buffer using the commands "%$VAR_{13}$NAME%" or "$PARAM_NAME$", where the "VAR_NAME" refers to the previously obtained parameter and "PARAM_NAME" refers to the modified parameter. For example, the manageable device script "abc%PARAM1%def" results a string buffer "abc123def" where the value of PARAM1 is "123". The manageable device scripts may further include a set of predefined conditions and functions. The parameters to be modified and their new values are received through unified setting interface 210, while the manageable device script to be executed is obtained from database 230. Preferably, the request generator 240 only generates submission requests for the purpose of modifying a parameter (or parameters) of a network manageable device.

As discussed above, the response processor 290 can be comprised of a parser 250 and a regular expression engine 220. The parser 250 parses the responses sent from the network manageable device. For example, if the network manageable device 270-2 responds to a submission request with a hypertext markup language (HTML) page, then the parser 250 parses the HTML page to extract the HTML tags, which are then passed to regular expression engine 220. The parser 250 sends a request to get the HTML page by sending the universal resource locator (URL) of the page to the network manageable device. The URL to be sent is retrieved from database 230. The regular expression engine 220 may be a state machine that supports data extraction. The regular expression engine 220 detects the network manageable device type, identifies its configurable parameters and extracts their values using a plurality of regular expressions. For example, if the response processor were commanded to retrieve a specific HTML page that contains a vendor name, the parser 250 would request the HTML page (through a URL retrieved from the database 230). The network manageable device sends the requested HTML page back to the parser 250, which parses it and extracts the name of the vendor using the regular expression engine 220.

A regular expression allows the detection of a single network manageable device or the extraction of the value of a single configurable parameter. As an example, the following regular expression is used to find the value of an "INPUT" HTML tag:

<input[ˆ>]*name="?username[ˆ>]*value="
   (?P<WAN_Username>[ˆ"]*)[ˆ>]*>

This regular expression extracts the value of an "INPUT" HTML tag with the name "username", e.g., <input name="username" length=4 value="abcd">. The value of this HTML tag (i.e., "abcd") is saved in the variable "WAN_Username". The extracted parameters and their values are passed to the unified setting interface 210. The specific regular expression to be used is obtained from database 230.

The device interface 260 allows the communication with the network manageable devices 270 using the respective communication protocol used to access each of the network manageable devices 270. The manageable device scripts generated by the request generator 240 are sent to the device interface 260 for distribution to the intended network manageable device. Responses from the network manageable devices are sent through the device interface 260 to the response processor 290, which is discussed in more detail below. As mentioned above, the device interface 260 communicates with the network manageable devices using at least one of the following protocols, i.e., Telnet, HTTP, SNMP and UPnP. In a Telnet connection, text commands are submitted through a command line interface (CLI). In a HTTP connection, the device interface 260 submits and retrieves the device parameters from multiple web pages (e.g., HTML pages), where each web page typically includes a group of configurable parameters having the same functionality. Each such web page is accessed through a different URL. The SNMP connection is utilized through a SNMP agent installed in the network manageable device. A SNMP agent mediates access to the configurable parameters of a device through management information base (MIB) messages. That is, the device interface 260 interacts with the SNMP agent by exchanging MIB messages. The UPnP protocol allows controlling and configuring manageable devices though a submission of XML messages. It should be noted that these connection formats are exemplary only and should not be viewed as limiting the scope of the disclosed invention.

As described in greater detail above, the unified setting interface 210 provides a single and common interface for all management applications that interact with the network manageable devices 270 via setting diagnostic agent 160. The unified setting interface 210 maintains at least the configurable parameters and the description (e.g., type, vendor, version, etc.) of each of network manageable devices 270-1 through 270-n. In the unified setting interface 210, the configurable parameters are grouped according to their functionality, e.g., a group of security parameters, a group of Internet connection parameters, etc. For each configurable parameter, the unified setting interface 210 assigns for each configurable parameter a unique name regardless of the network manageable device's type. The parameter name given by unified setting interface 210 is associated with the original parameter name.

In an embodiment of the present invention, the manageable applications 280 interface with the unified setting interface 210 through function calls. For example, to modify the value of a specific parameter the function call "modify (deviceID, parameter_name, new_value)" is used, and to retrieve the value of a specific parameter, the function call "get (deviceID, parameter_name)" is used. It should be emphasized that all management applications 280 use the function calls provided by the unified setting interface 210. It should be further emphasized that the parameter_name designated in a function call is the parameter name give by a management application 280. The database 230 contains the data related to the network manageable devices supported by setting diagnostic agent 160 and is described in greater detail below.

Preferably, the database 230 storing the regular expressions and manageable device scripts comprises an element of the setting diagnostic agent 160. However, in other embodiments of the present invention, the database 230 does not have to be part of the setting diagnostic agent 160. Furthermore, the regular expressions and scripts are retrieved from memory or other forms of storage, and do not have to be stored within a structured database.

Figure 3:
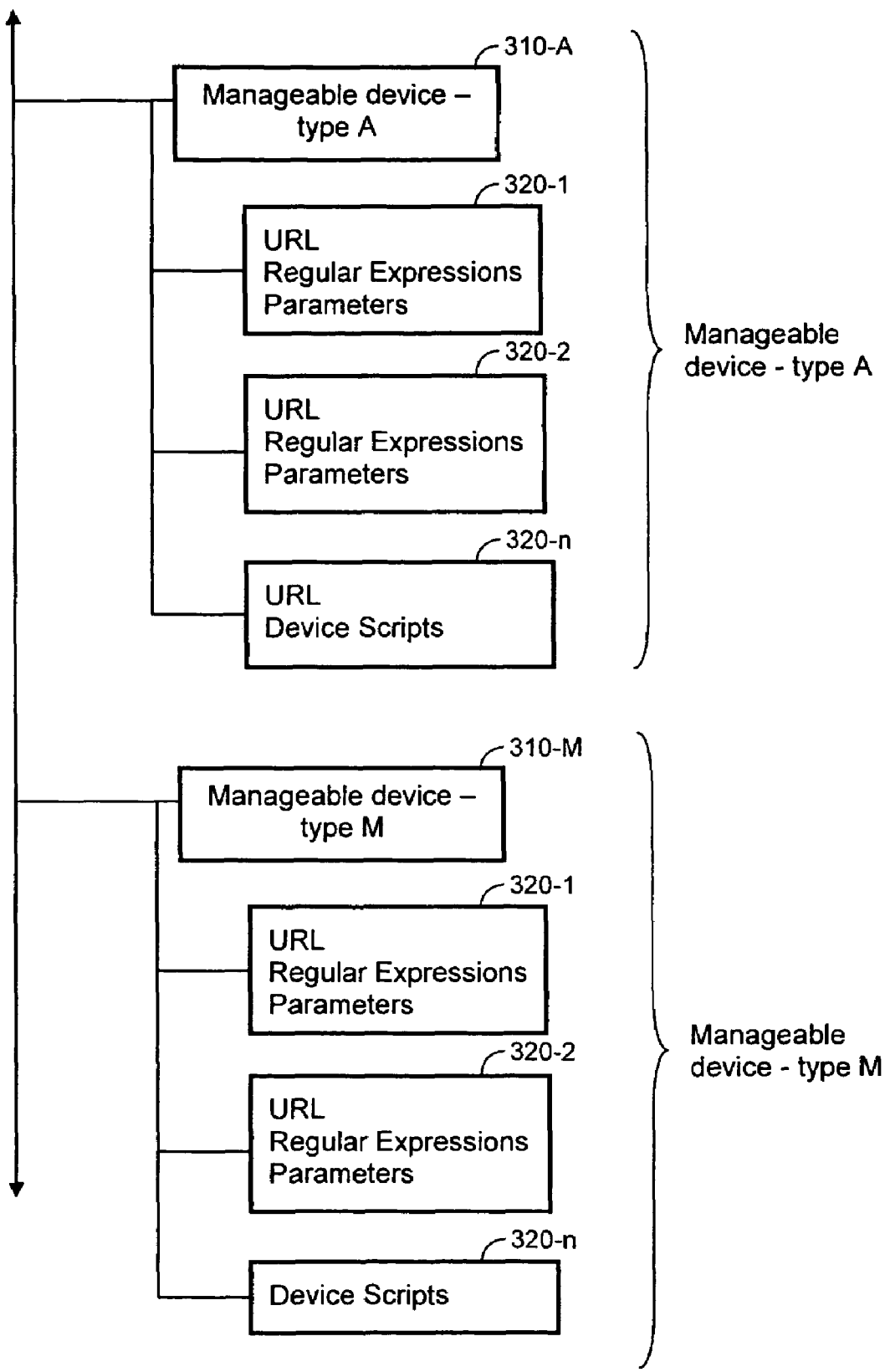
FIG. 3 is an exemplary schema of a database in accordance with an embodiment of the present invention.

Referring to FIG. 3, an exemplary non-limiting schematic diagram of the database 230 is shown. The database 230 is organized in a hierarchical structure with at least two levels of hierarchy. The higher level includes entries 310 and the lower level includes sub-entries 320 of a respective entry 310. Each entry 310 is related to a single type of network manageable device. The sub-entries 320 include a list of identification parameters, such as vendor, model name and number, serial number, manufacturer name, a list of authorization parameters (i.e., username and password), a list of configurable parameters and a list of manageable device scripts for generating the submission requests. Each configurable parameter is associated with a regular expression used for the purpose of extraction of the parameter's value. Sub-entries 320 further include the location of each configurable parameter. For example, the parameters' locations of a network manageable device with a HTTP interface are expressed by URLs. Typically, each URL designates the source of a web page that contains a group of configurable parameters having a common functionality (e.g., wireless connection parameters). The regular expressions and the manageable device scripts are pre-programmed and stored in the database 230. An operator (e.g., system administrator, network user, etc.) loads the manageable device scripts, the regular expressions and other configuration information into the database from a computer medium such as a CD-ROM. Alternatively, an operator can create his or her own specialized manageable device scripts and regular expressions if interface information for a particular manageable device is available.

Referring to FIG. 4, an exemplary portion of a database 230 file used by the present invention is illustrated. FIG. 4 shows a single entry 310 (line 4010) that includes information about an exemplary and non-limiting Linksys™ router with two router parameters: "firmware version" and "WAN connection type". Sub-entries 320 (shown in lines 4020 through 4340) includes the router identification parameters, the URLs and the regular expressions used to extract the configurable parameters found in each page accessed by each URL. The router identification parameters (shown in lines 4030 through 4060) include the HTTPID parameter, and the authorization variables that include the username and password required for accessing the router. As shown in line 4220, the URL "/index.html" includes a web page that contains the "WAN connection type" parameter. This parameter defines the type of connection to an Internet service provider (ISP). The regular expression, shown in line 4230, extracts the value of the "WAN connection type" parameter and save it in the "Wan_Connection-Type" variable. This is performed by parsing the web page and using the regular expression to search for a "WANConnectionType" string. Once found, the value of "WANConnectionType" parameter is extracted. The name of the "Wan_Connection_Type" variable is a unique name given by the unified setting interface to all parameters that represent the type of the WAN connection. The parameter section (shown in lines 4250 through 4280) contains a list of router parameters that is provided to the unified setting interface 210, as well as the corresponding manageable device scripts. The "Submit" section (lines 4290 through 4320) includes a manageable device script that generates the HTTP requests to be sent to the router in order to configure the router with the new value of the "Wan_Connection_Type" variable. The scripts are used to generate data buffers using the previously obtained router settings. For example, the setting of the "Wan_Connection_Type" variable is obtained using the command "%Wan_Connection_Type%" (as shown in line 4270) and its new value is submitted using the command "$Wan_Connection_Type$" (as shown in line 4310).

Figure 5:
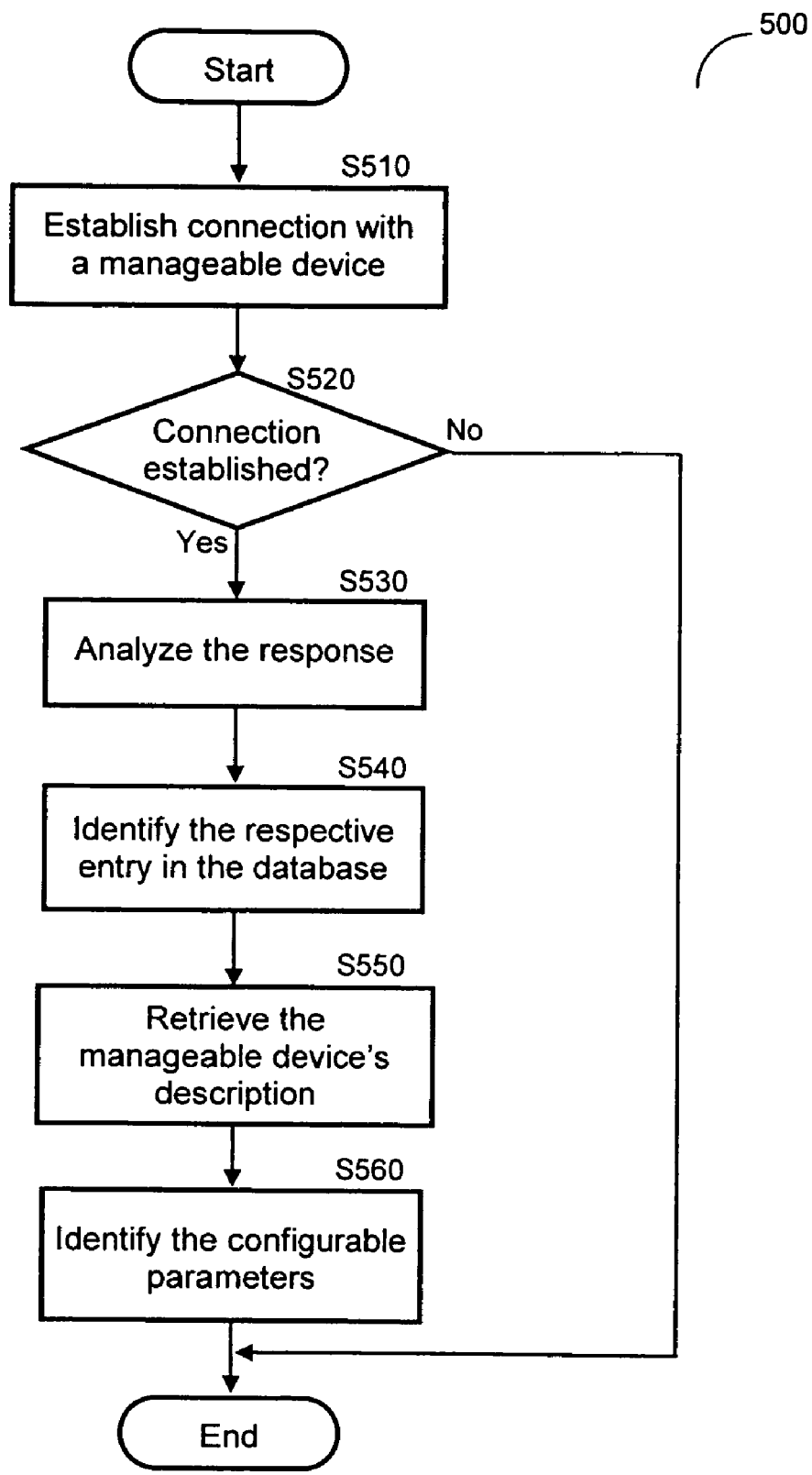
FIG. 5 is a non-limiting flowchart describing the operation of the setting diagnostic agent in accordance with an embodiment of the present invention.

Referring to FIG. 5, a non-limiting flowchart 500 describing the method for creating the unified setting interface 210 in accordance with an embodiment of the present invention is shown. At S510, the setting diagnostic agent 160 tries to establish a connection to a network manageable device using a default IP address. The default IP address is provided by the vendor of the manageable device. A message is sent to the network manageable device using HTTP. At S520, a check is performed to determine if the accessed network manageable device responds, and if so, at S530, the response sent from the network manageable device is analyzed to detect the type of the network manageable device. If the network manageable device does not respond, the execution is ended. At S540, an entry in the database 230 associated with the detected network manageable device is identified. At S550, the network manageable device is accessed to retrieve more information on the manageable device. The setting diagnostic agent 160 retrieves the network manageable device's description from a URL provided by the device in the response message. The network manageable device's description includes the vendor, manufacturer model name and number, serial number, manufacturer name, firmware version, URLs for control, evening and presentation, and URLs of the configurable parameters.

In some cases, an authorization process is required (i.e., submission of the username and the password of the manageable device) to retrieve the manageable device's description. In such cases, the default authorization variables are used, if the authorization variables are not provided, the user is prompted to enter them. At S560, the configurable parameters are identified and then passed to the unified setting interface 210. The unified setting interface 210 maintains the configurable parameters and the description (e.g., type, vendor, version, etc.) of each of manageable devices 270-1 through 270n. In the unified setting interface 210, the configurable parameters are grouped according to their functionality, i.e., a group of security parameters, a group of Internet connection parameters, etc. For each configurable parameter, the unified setting interface 210 assigns a unique name regardless of the manageable device's type. For example, the name of WAN connection type in a Linksys router is "WANConnectionType", while the name for the same parameters in a Belkin router is "WAN_Port". The name of this parameter given by the unified setting interface 210 is "WAN_Connection_Type". Furthermore, the unified setting interface 210 provides to all management applications 280 a unique set of commands (e.g., function calls) through which the management applications 280 interact with the unified setting interface 210.

Figure 6:
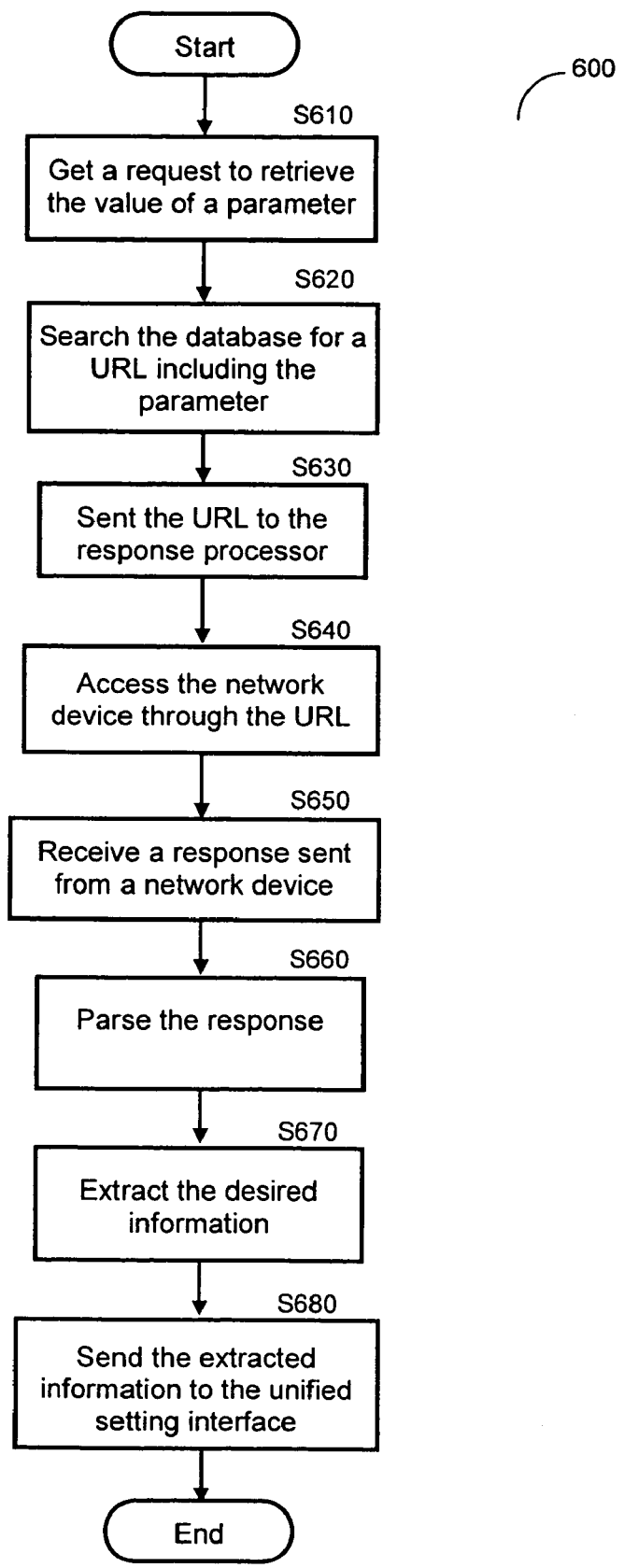
FIG. 6 is a non-limiting flowchart describing a method for retrieving a value of a configurable parameter of a network manageable device in accordance with an embodiment of the present invention.

Referring to FIG. 6, a non-limiting flowchart 600 describing the method for retrieving the value of a configurable parameter is shown. At S610, a management application 280 requests the unified setting interface 210 to retrieve the value of a configurable parameter from a specific manageable device 270 using, for example, the "get" function call. For instance, to retrieve the value of the WAN connection type parameter in a Linksys router, the function call get(Linksys BEFSR41, WAN_Connection_Type) is sent to the unified setting interface 210. At S620, the database 230 is searched for the URL that includes the parameter designated in the function call. Specifically, the unified setting interface 210 looks for a URL that includes the original parameter name. For example, for the "get" function call shown above the WANConnectionType parameter name is searched (instead of WAN_Connection_Type). At S630, the URL that includes the requested parameter is retrieved from the database 230 and is sent to the response processor 290. At S640, the response processor 290 accesses the network manageable device 270 through the URL to get the page that includes this parameter. At S650, the response processor 290 receives a response sent (e.g., a HTML page) from the network manageable device 270 through the device interface 260. At S660, the response processor 290 (using the parser 250) parses the received response and the parsed information is sent to regular the expression engine 220. At S670, the regular expression engine 220 extracts the desired information, e.g., the value of the requested configurable parameter using a regular expression designed to extract this particular value. The regular expression to be used is obtained from the database 230. For example, to extract the value of WANConnectionType the regular expression provided in FIG. 4 line 4230 is used. At S680, the extracted information is sent to the unified setting interface 210, which subsequently sends it to the management application 280 that requested this information.

Figure 7:
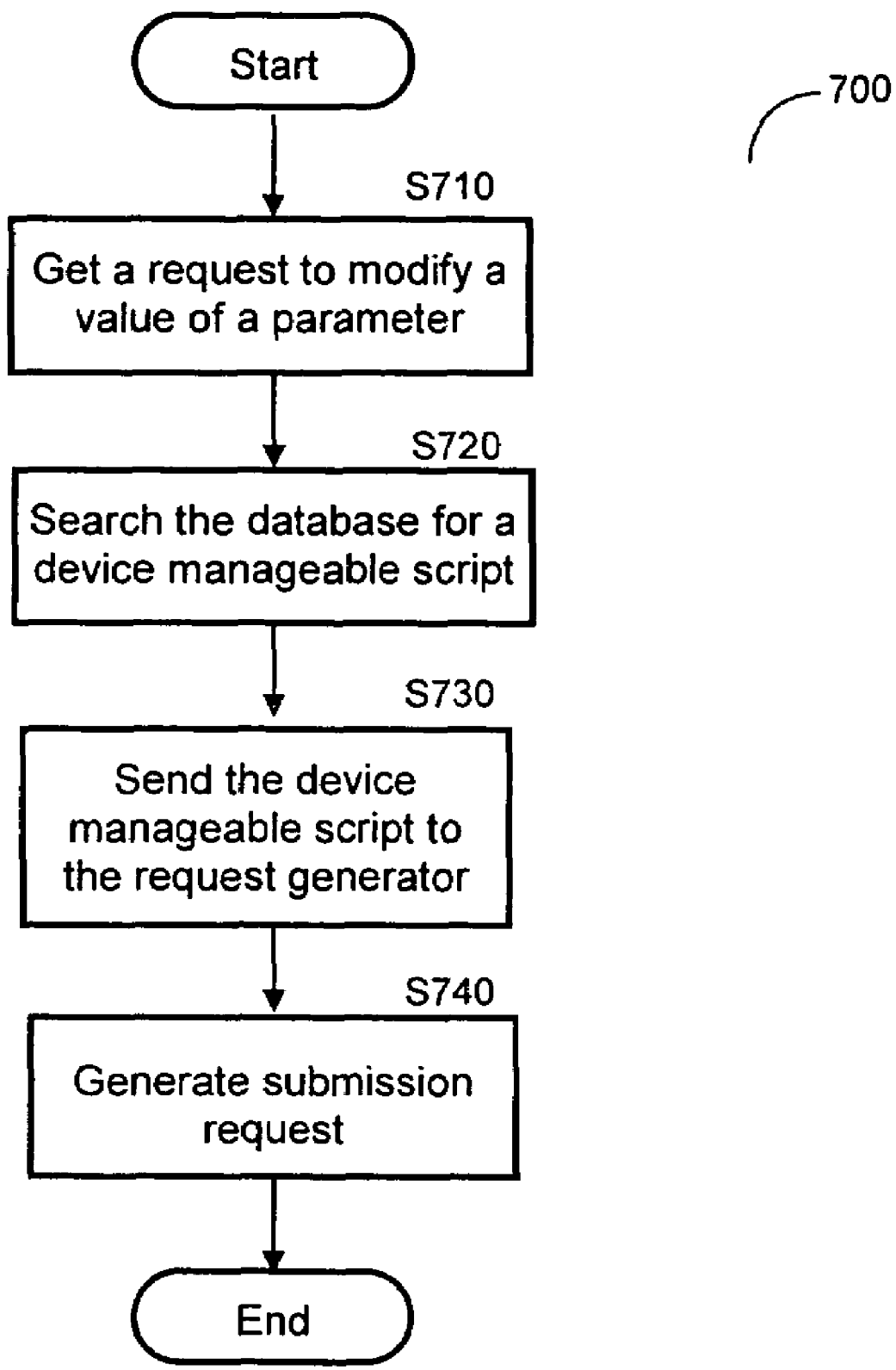
FIG. 7 is a non-limiting flowchart describing a method for modifying a value of a configurable parameter of a network manageable device in accordance with an embodiment of the present invention.

Referring to FIG. 7, an exemplary non-limiting flowchart describing a method for modifying a value of a configurable parameter is illustrated. At S710, a management application 280 sends to the unified setting interface 210, the identification of a manageable device, the parameter name, and the new value to be reconfigured, for example, using the "modify" function call. For instance, in order to modify the WAN connection type parameter in a Linksys router, the function call modify(Linksys BEFSR41, WAN_Connection_Type, dhcp) is sent to the unified setting interface 210. At S720, the unified setting interface 210 searches in the database 230 for the manageable device script used to generate the HTTP requests for submitting the new value to the targeted network manageable device. At S730, the manageable device script to be used is obtained from the database 230 and sent to the request generator 240. For example, the manageable device script shown in FIG. 4 line 4310 is used to modify the WAN_Connection_Type of the Linksys router. At S740, the HTTP requests required to reconfigure the parameter designated in the "modify" function call are generated and sent to the network manageable device. As described above, the creation of the HTTP requests comprises substituting the parameters of the HTTP requests (i.e., the data to be submitted, the HTTP method to be used, etc.) in a string buffer. The string buffer is in a format compliant with the interface of the network manageable device. It should be noted that if the network manageable device generates a response indicating that the parameter has been successfully configured, this response is handled by the response processor 290.

The methods have now been described with reference to a specific embodiment where a HTTP connection is used to access the manageable device. Other embodiments will be apparent to those of ordinary skill in the art. For example, the method can be adapted for the use with manageable devices utilizing connection formats, such as SNMP, Telnet, UPnP, and other connection formats.

The present invention can be implemented in software, hardware, firmware or various combinations thereof. In an embodiment of the present invention, the elements are implemented in software that is stored in a memory and that configures and drives a digital processor situated in the respective wireless device. The software can be stored on any computer-readable media for use by or in connection with any suitable computer-related system or method. It will be appreciated that the term "predetermined operations" and the term "computer system software" mean substantially the same thing for the purposes of this description. It is not necessary to the practice of the present invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar media useable by computers. For example, to distribute computer system software, the supplier might provide a diskette or might transmit the instructions for performing predetermined operations in some form via satellite transmission, via a direct telephone link, or via the Internet. More specific examples of computer-readable media would include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical). The computer readable media could even be paper or another suitable media upon which the program is printed, as the program can be electronically captured, via for instance optical scanning of the paper or other media, then compiled, interpreted or otherwise processed in a suitable manner if necessary, and then stored in a computer memory.

Although computer system software might be "written on" a diskette, "stored in" an integrated circuit, or "carried over" a communications circuit, it will be appreciated that, for the purposes of this discussion, the computer usable media will be referred to as "bearing" the instructions for performing the predetermined operations. Thus, the term "bearing" is intended to encompass the above and all equivalent ways in which instructions for performing predetermined operations are associated with a computer usable media.

Therefore, for the sake of simplicity, the term "program product" is hereafter used to refer to a computer useable media, as defined above, which bears instructions for performing predetermined operations in any form.

In one embodiment, the present invention can operate in conjunction with diagnostic tools that are capable of automatically repairing and detecting malfunctions in local networks, such as LANs and WLANs. Furthermore, the present invention can operate in conjunction with diagnostic tools capable of automatically setting local networks. An example for such diagnostic tool is disclosed in U.S. patent application Ser. No. 10/885,017 entitled "METHOD AND APPARATUS FOR AUTOMATIC DIAGNOSIS AND RESOLUTION OF WIRELESS NETWORK MALFUNCTIONS", assigned to the common assignee and which is hereby incorporated by reference for all that it contains.

Furthermore, the setting diagnostic agent disclosed herein can be utilized in several applications targeted to ease the management and configuration of networks, such as home digital networks. These applications may be, but are not limited to, a first time setup of network manageable devices and a management interface allows configuring different devices in the same environment.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the pringples of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A system enabling the configuration of at least one network manageable device, the system comprising:
   a processor;
   a memory communicatively coupled with the processor, wherein the memory is encoded with elements comprising:
      a unified setting interface, wherein the unified setting interface interfaces with a management application, wherein the management application transmits a device request to the unified setting interface;
      a database, wherein the database is arranged as a hierarchical structure comprising:
         a higher level, wherein the higher level comprises an entry associated with a single network manageable device; and
         a lower level, wherein the lower level comprises sub-entries associated with an entry, wherein the sub-entries comprise a list of identification parameters comprising:
            a vendor;
            a model name;
            a model number;
            a serial number;
            manufacture name;
            a list of authorization parameters, wherein the authorization parameters comprise a username and password;
            a list of configurable parameters; and
            a list of manageable device scripts for generating a submission request;
      a request generator, wherein the request generator receives the device request from the unified setting interface and generates a submission request to modify a network manageable device parameter, wherein the submission request:
         contains predefined conditions and functions; and
         is generated as a device script designed to generate a submission request for a specific type of network manageable device;
      a device interface, wherein the device interface receives the submission request and communicates the submission request to a network manageable device; and
      a response processor, wherein the response processor receives a response of the network manageable devices via the device interface, wherein the response processor comprises:
         a parser, wherein the parser parses the response from the network manageable device; and a regular expression engine (REE), wherein the regular expression engine:
    detects the network manageable device type;
    identifies configurable parameters associated with the network manageable device; and
    extracts values associated with the configurable parameters utilizing a plurality of regular expressions; and
wherein the response processor extracts data from the network manageable device response and forwards the extracted data to the unified setting interface for transfer to the at least one management application.

2. The system of claim 1, wherein the unified setting interface allows the at least one management application to request configurable parameters of the at least one network manageable device.

3. The system of claim 2, wherein, for each of the configurable parameters, the unified setting interface provides a unique name regardless of the type of the network manageable device.

4. The system of claim 2, wherein the unified setting interface comprises a set of commands through which the at least one management application requests the configurable parameters.

5. The system of claim 1, further comprising the device interface communicates with the at least one network manageable device using at least one of a Telnet connection, hypertext transfer protocol, simple network management protocol and universal plug and play protocol.

6. A system enabling the configuration of at least one network manageable device, the system comprising:
    a processor;
    a memory communicatively coupled with the processor, wherein the memory is encoded with elements comprising:
        interface means that interface with at least one management application to generate a device request; and
        response means that executes a regular expression on a response output by the at least one network manageable device that received the device request, wherein the regular expression extracts data from the network manageable device response and forwards the extracted data to the interface means for transfer to the at least one management application, wherein the response means comprises:
            means for parsing the response output by the at least one network manageable device; and
            engine means for executing a regular expression to extract data to be forwarded to the unified setting interface, wherein a regular expression extracts.

7. The system of claim 6, wherein the interface means allows the at least one management application to request configurable parameters of the at least one network manageable device.

8. The system of claim 7, wherein, for each of the configurable parameters, the interface means provides a unique name regardless of the type of the network manageable device.

9. The system of claim 7, wherein the interface means comprises a set of commands through which the at least one management application requests the configurable parameters.

10. The system of claim 7, wherein the extracted data relates to configurable parameters of the at least one network manageable device.

11. The system of claim 6, further comprising a storage means comprising a plurality of entries is associated with the at least one network manageable device.

12. The system of claim 11, wherein each of the entries comprises a plurality of sub-entries, each of the sub-entries comprises at least one of a regular expression, a manageable device script, an authorization parameter, an identification parameter and an address of a configurable parameter.

13. The system of claim 6, further comprising communication means for communicating with the at least one network manageable device using at least one of a Telnet connection, hypertext transfer protocol, simple network management protocol and universal plug and play protocol.

14. The system of claim 6, wherein the response means accesses storage means that stores a plurality of regular expressions.

15. A system enabling the configuration of at least one network manageable device, the system comprising:
    a processor;
    a memory communicatively coupled with the processor, wherein the memory is encoded with elements comprising:
        a unified setting interface that interfaces with at least one management application to generate a device request, wherein the unified setting interface allows the at least one management application to modify configurable parameters of the at least one network manageable device, wherein, for each of the configurable parameters, the unified setting interface provides a unique name regardless of the type of the network manageable device;
        a request generator that generates a submission request to the at least one network manageable device based on a translated device request received from the unified setting interface;
        a response processor that executes a regular expression on a response output by the at least one network manageable device that received the translated device request, wherein the regular expression extracts data from the network manageable device response and forwards the extracted data to the unified setting interface for transfer to the at least one management application.

16. The system of claim 15, wherein the unified setting interface comprises a set of commands through which the at least one management application sets the configurable parameters.

17. The system of claim 15, further comprising a database comprising a plurality of entries is associated with the at least one network manageable device.

18. The system of claim 17, wherein each of the entries comprises a plurality of sub-entries, each of the sub-entries comprises at least one of a regular expression, a manageable device script, an authorization parameter, an identification parameter and an address of a configurable parameter.

19. The system of claim 18, wherein the manageable device script is used for generating the submission request.

20. The system of claim 19, wherein the submission request is in a format compliant with the at least one network manageable device.

21. The system of claim 15, wherein the submission request is at least an HTTP request.

22. The system of claim 15, further comprising a device interface that communicates with the at least one network manageable device using at least one of a Telnet connection, hypertext transfer protocol, simple network management protocol and universal plug and play protocol.

23. The system of claim 15, wherein the response processor comprises:
- a parser that parses the response output by the at least one network manageable device; and
- a regular expression engine that executes a regular expression to extract data to be forwarded to the unified setting interface.

24. The system of claim 23, wherein the response processor accesses a memory that stores a plurality of regular expressions.

* * * * *